US006809731B2

United States Patent
Muffler et al.

(10) Patent No.: US 6,809,731 B2
(45) Date of Patent: Oct. 26, 2004

(54) SYSTEM AND METHOD FOR RENDERING HIGH-RESOLUTION CRITICAL ITEMS

(75) Inventors: Ronald J. Muffler, Salt Lake City, UT (US); Harold Dee Gardiner, Sandy, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 262 days.

(21) Appl. No.: 10/042,540

(22) Filed: Jan. 8, 2002

(65) Prior Publication Data

US 2003/0128210 A1 Jul. 10, 2003

(51) Int. Cl.[7] .............................................. G06T 15/00
(52) U.S. Cl. ...................................................... 345/428
(58) Field of Search ................................. 345/428, 419

(56) References Cited

U.S. PATENT DOCUMENTS

| | | | |
|---|---|---|---|
| 5,025,394 A | | 6/1991 | Parke |
| 5,239,625 A | | 8/1993 | Bogart et al. |
| 5,241,659 A | | 8/1993 | Parulski et al. |
| 5,781,666 A | * | 7/1998 | Ishizawa et al. ............ 382/284 |
| 5,864,342 A | | 1/1999 | Kajiya et al. |
| 5,867,166 A | | 2/1999 | Myhrvold et al. |
| 5,889,529 A | | 3/1999 | Jones et al. |
| 6,128,021 A | * | 10/2000 | van der Meulen et al. . 345/428 |
| 6,147,695 A | * | 11/2000 | Bowen et al. ............... 345/503 |
| 6,304,245 B1 | * | 10/2001 | Groenenboom ............. 345/611 |
| 6,362,817 B1 | * | 3/2002 | Powers et al. .............. 345/419 |
| 6,456,288 B1 | * | 9/2002 | Brockway et al. .......... 345/428 |
| 6,591,020 B1 | * | 7/2003 | Klassen ...................... 382/269 |

OTHER PUBLICATIONS

Talisman: Commodity Realtime 3D Graphics for the PC, Torborg, Jay and Kajiya, James T., Computer Graphics Proceedings, Annual Conference Series, 1996.

* cited by examiner

*Primary Examiner*—Don Wong
*Assistant Examiner*—Huedung X Cao
(74) *Attorney, Agent, or Firm*—Thorpe North & Western LLP

(57) ABSTRACT

A device is provided for rendering computer graphic images with a database and geometric processor to process a plurality of polygons. The device includes a background rendering engine to render the polygons received from the geometric processor. A critical item detector is configured to identify polygons received from the geometric processor that have at least a portion of the polygon within a critical item region. In addition, a critical item rendering engine is included to render polygons identified by the critical item detector. The identified polygons in the critical item engine are rendered at a higher resolution than the polygons rendered by the background rendering engine. A critical item load manager is coupled to the critical item rendering engine to increase or decrease a critical item load being rendered by the critical item rendering engine, and to match a deterministic processing time allowed.

20 Claims, 5 Drawing Sheets

SYSTEM AND METHOD FOR RENDERING HIGH-RESOLUTION CRITICAL ITEMS

FIELD OF THE INVENTION

The present invention relates generally to generating high-resolution computer graphics imagery. More particularly, the present invention relates to generating high-resolution graphics imagery using high-resolution critical items defined in a computer database.

BACKGROUND

One of the things that must be done in order to generate a high fidelity image for computer simulation purposes is to compute picture details, or picture elements (pixels), sufficiently small to resolve the smallest object potentially visible to the viewer. The value of being able to resolve the smallest object possible is especially important in such high fidelity computer simulation applications such as flight or military simulators.

A limitation of computer based visual systems is that it is not practical to generate imagery at the resolution limit of the observer over large fields of view by the method of generating massive quantities of pixels. Even with the impressive increases in computational power achieved in recent times and the continued forecast of ever increasing computational power, the technology remains unable to provide this at a cost effective price.

A major goal of visual system design is to reproduce all the effects of the real world inside the simulation visual system. In order to provide the visual image to the pilot that provides all the actual cueing that he would normally get from the real world, the scene must be computed at least at the resolution limit of his vision. A full 4 pi steradian field of view displayed at eye limiting resolution would require in excess of 500 Million pixels to be computed 60 times a second with full depth coverage. Even with the stunning increases in computational power achieved in recent times and the continued forecast of ever increasing computational power, computer systems are still somewhere between 50 and 100 times short of being able to provide the cost effective, high-resolution graphics output that the high fidelity simulators need.

Previous visual systems that have attempted to manage resolution resources fall into one of four categories. The first category is visual systems that generate imagery by computing a uniform distribution of pixel resources throughout the field of view. The second category is visual systems that produce a higher resolution in a fixed forward field of view by computing and displaying narrower channels in the forward portion of the field of view.

A third category of visual systems are those that produce higher resolution inserts which are either head-tracked or eye-tracked as a way of producing higher resolution without computing all the pixels needed to provide uniform resolution. These Area of Interest (AOI) techniques have achieved limited success but all have artificial limitations and implementation complexities. These limitations typically force the viewer to behave in an unnatural manner such as directing his head toward something he wants to observe and then waiting for the visual system to catch up.

A fourth category of visual systems dynamically modifies the entire output resolution level and manages the computational resources as a function of the detail of the imagery to be computed. This approach is directed at keeping the pixel computational resources deterministic rather than greatly leveraging the resolution resources.

SUMMARY OF THE INVENTION

The invention provides a device for rendering computer graphic images, including a database and geometric processor to process a plurality of polygons. The device further comprises a background rendering engine to render the polygons received from the geometric processor. A critical item detector is configured to identify polygons received from the geometric processor that have at least a portion of the polygon within a critical item region. In addition, a critical item rendering engine is included to render polygons identified by the critical item detector. The identified polygons in the critical item engine are rendered at a higher resolution than the polygons rendered by the background rendering engine. A critical item load manager is coupled to the critical item rendering engine to increase or decrease a critical item load being rendered by the critical item rendering engine, and to match a deterministic processing time allowed.

In accordance with an alternative embodiment of the present invention, the system provides a device for rendering a high-resolution graphic image. The system provides a database of polygons, where each polygon is enabled to be associated with a critical item flag and a critical item priority. A geometric processor is also used to geometrically transform polygons from the database. A critical item detector is configured to identify polygons received from the geometric processor which are associated with a critical item region. A critical item rendering engine receives polygons identified by the critical item detector using the critical item region and renders the polygons in a higher resolution than background polygons. A critical item load manager is further coupled to the critical item rendering engine to determine the number of critical items to be rendered for a frame, based on a processing time available for renderings of critical items and the critical item priority of the polygons.

Another embodiment of the present invention is a method for rendering critical objects in a computer graphic image at a higher resolution than background objects in order to provide high-resolution output items for a viewer. The method includes the step of associating a critical item flag with the critical objects stored in a database that models an environment. Another step is detecting critical objects, based on a critical item region. Yet another step is rendering the detected critical objects at a higher resolution than background objects. A further step is combining a lower resolution background with higher resolution critical objects.

DETAILED DESCRIPTION

Figure 1:
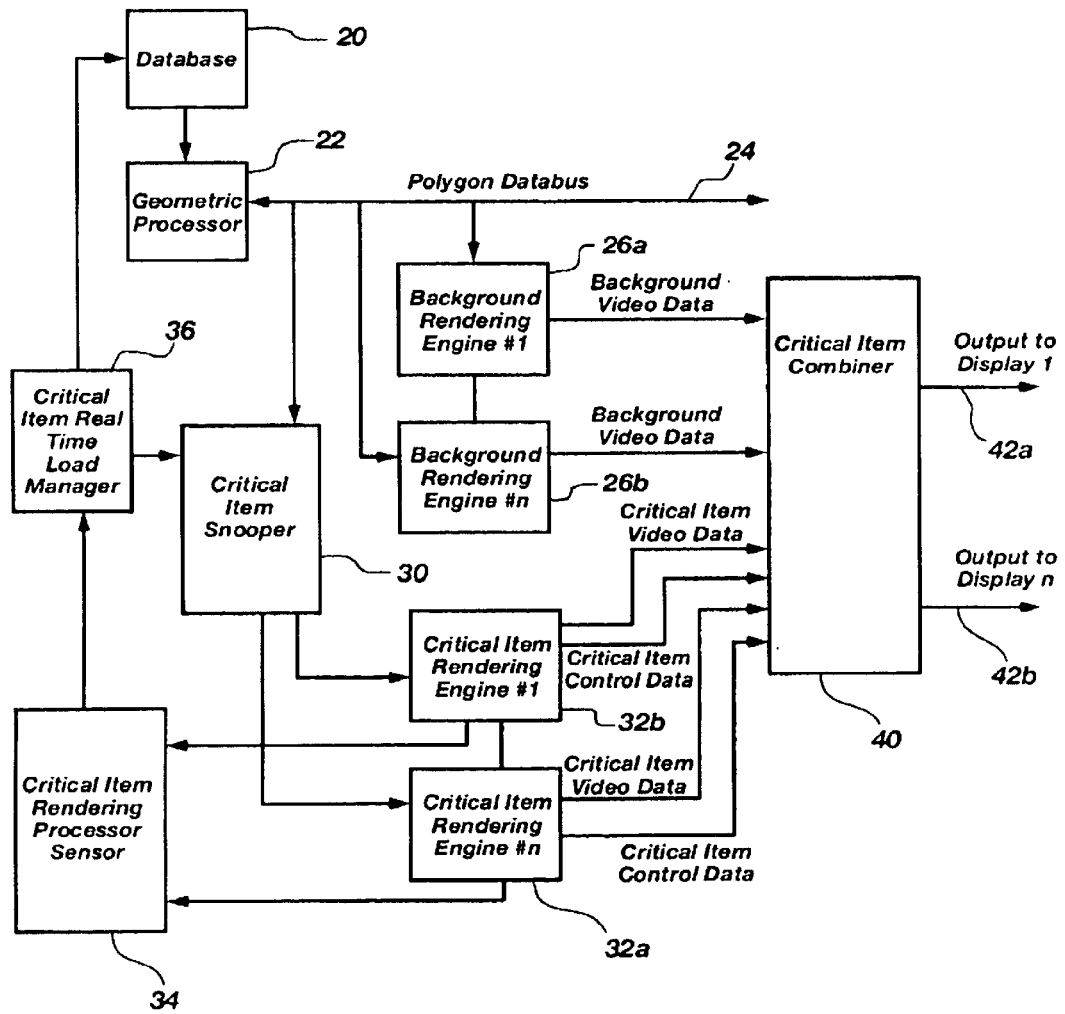
FIG. 1 is a block diagram of a device for critical item rendering.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

As described above, one significant limitation of computer based visual systems is that it is not practical to generate imagery at the eye resolution limit of an observer over large fields of view. This invention describes a system and method to allow a visual system to adapt its computational resources in a way that provides extremely high detail image content in areas of potential interest while conserving overall computational resources. This approach has the ability to significantly increase the effectiveness of the pixels computed.

Simulation applications, such as aviation or military simulations, generally desire to use a large field of view. Use of the present invention in such simulation circumstances effectively demonstrates the cost benefits of this invention. Notwithstanding, the present invention also applies equally well to other computer visual system applications where an improved performance/cost ratio is important. A system can compute higher resolution with less computational resources using the critical item system and method as described herein. As such, the description provided is given in the context of image generator architecture for ease of understanding, but the invention can be applied in virtually all visual system graphics applications.

As illustrated in FIG. 1, a database 20 contains a plurality of polygons that form geometric objects and model a simulated environment for a viewer. These polygons or objects are sent to a geometric processor 22 that performs transformations and processes the database for a wide background field-of-view. The geometric processor also monitors the current location of all critical items within the background scene. These critical item locations define regions of interest or critical item regions in which the critical items reside. A critical item flag is associated with each critical item polygon and/or object. Along with identifying an object or polygon as a critical item, a critical item priority flag can include information relating to the priority and transition ranges for each of the various levels of resolution detail.

A critical item snooper or critical item detector 30 monitors the polygon data bus 24 for all polygons that are contained completely in the critical item region or at least part of the polygon is in the critical item region. The critical item snooper then passes the polygon information onto the critical item rendering engines 32a, 32b to be rendered at high-resolution. The critical item rendering engine can render everything within the field-of-view (FOV) surrounding critical item at the resolution specified by the critical item real time management algorithm. Everything within the critical item region is rendered at high resolution to provide the proper occultation.

The background rendering engines 26a, 26b pull all the polygon data off the polygon data bus 24 and render it at the specified background resolution level. The rendered polygons are then passed into the critical item combiner 40. The critical item combiner takes the low-resolution background data and expands it (e.g., via filtering, interpolation, etc.) to increase the data density of the background video to match that of the high-resolution critical items.

Critical items can either be processed as an object with only a pixel wide buffer surrounding the complex outline of the object, an object with no buffer surrounding the object (i.e., the critical item window can be the same size as the object), or as an object surrounded by a larger window of higher resolution imagery. The video data from the high-resolution critical items is passed onto the critical item combiner 40 along with the location information that allows the critical item combiner to geometrically insert each of the critical items into the correct location. The multiplexing operation of the critical item combiner presents a consistent high bandwidth output that will drive the output to the display devices 42a, 42b. This invention works equally well with all types of display and projection devices (e.g., cathode ray tube devices, liquid crystal devices, micro-mirror devices, and laser projection devices).

In one embodiment, the critical item flag carried along with each polygon or object is used by the critical item combiner 40 to identify high-resolution pixels to copy over their low-resolution counterpart pixels. Alternatively, the critical item combiner can select between the low-resolution background and high-resolution pixels as the critical regions are output to a display.

A critical item can be anything identified in the database as an object of potential interest. This ability to identify any objects and polygons as critical items allows the database designer the flexibility to designate items of potential interest as well as the priority of those items. The object priority and the critical item rendering engine processing time allow the critical item real time load manager 36 or master controller to increase or decrease the critical item load being rendered. The critical item load can be affected by the number of critical items computed at the higher resolution, the selected resolution for the critical items, and the size of the window surrounding the critical items.

The critical item real time management method allows the system to control the resolution of the critical items being rendered as the critical item rendering load changes. The size of the window surrounding a critical item polygon or object can also be dynamically adjusted based on the load of the critical item rendering engines. The operation details of this method will be discussed in farther detail in conjunction with FIG. 3.

It is also possible to use only one rendering engine and configure that engine to render both the low-resolution polygons and then the high-resolution critical items as the critical item detector and load manager dictates. Multiple rendering engines are preferable but the system can be scaled down for a less expensive system with only one rendering engine.

As mentioned above, the critical item real time load manager 36 monitors the processing load of each critical item rendering engine and compares the resultant time with the available processing power. If the critical item real time load manager determines that additional critical items can be safely processed while guaranteeing that the system processing times will stay deterministic, then it will determine which additional critical items or rendering features can be added to the rendering engines' work load. When the critical item real time load manager senses either an overload or an impending overload, it will refer back to its built in load management algorithm and cull critical items from those being processed or adjust critical item resolutions and window sizes.

Another part of the load manager is the critical item rendering processor sensor 34 that detects the length of time the critical time rendering engine is using to render the critical item list provided to it. The rendering processor sensor can be separate from the load manager or it can be incorporated into the load manager.

The system preferably uses a critical item priority to determine which critical items to remove from the rendering list. Alternatively, critical item priority may not be included for polygons and objects. In such a case, the culling of polygons for load increases can be done using methods such as rendering only the first critical item polygons received or selecting the closest critical item polygons to the viewer.

Figure 2:
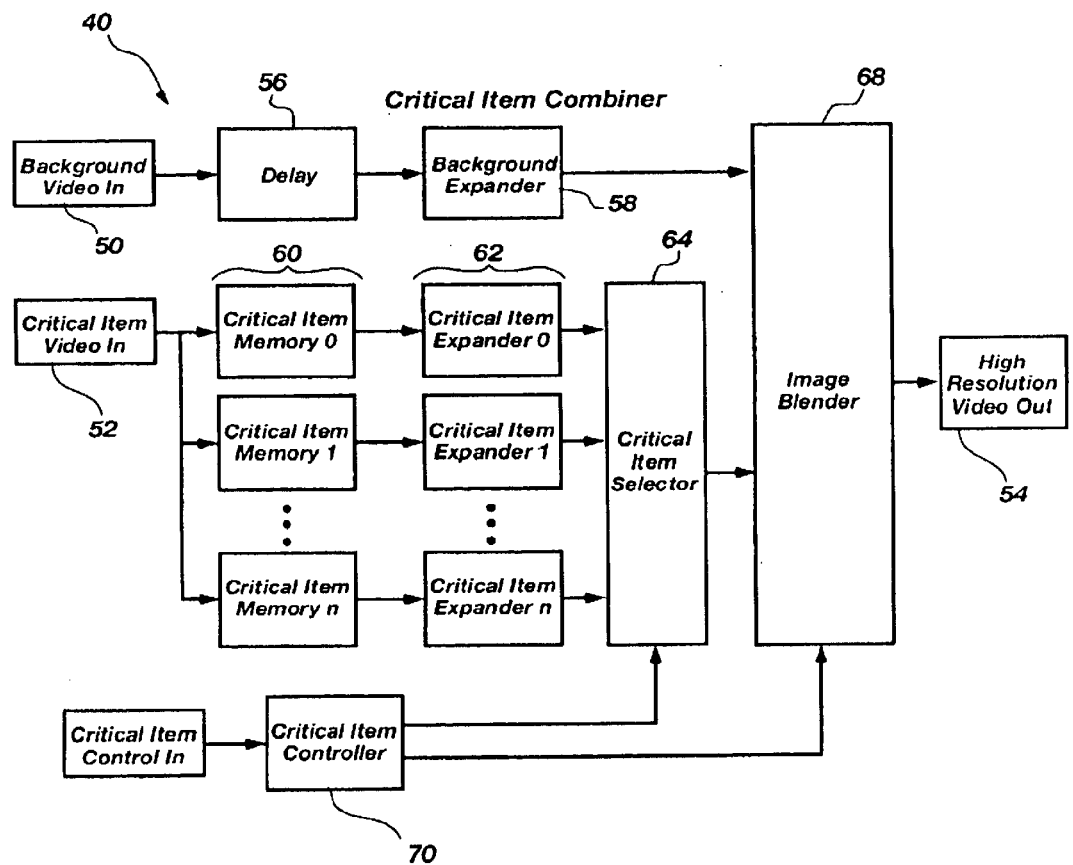
FIG. 2 is a block diagram of components contained in the critical item combiner of FIG. 1.

The critical item combiner will now be discussed in further detail. As can be seen in FIG. 2, the critical item combiner 40 takes a background stream 50 and critical item stream 52 along with display space addresses as inputs. As output, it provides display data to a dedicated display or projection device 54. Multiple background channels and critical item channels can be provided by using serial and or parallel data streams. Additional output circuits can also be supplied by using multiple output circuits for one or more output channels.

The critical item combiner delays the background image 56 until critical items near the top of the frame have been loaded in their memories. This adds a few lines of latency to the system. Then the background expander 58 expands the low-resolution background image into the high-resolution output needed for display.

Further, the critical items are divided into separate items and stored in portions of memory 60 until needed. These memories are loaded in a top-to-bottom screen order so that the top-most items will be ready to process when the raster scanning gets to those raster lines. The critical items are also expanded 62 into the highest resolution output format, if necessary. Some critical items will be received at the highest display resolution and others will be in a lower resolution (although not as low as the background). The critical item selector allows the highest priority critical item 64 for each pixel to be sent to the image blender 68. The critical item controller 70 receives critical item definitions (e.g., position, size, priority, etc.) from the master controller and determines where and how to mix the critical items into the background image. More complex alternative approaches can use some blending to merge overlapping critical items before the pixel is sent to the image blender.

The image blender 68 blends or replaces the expanded background pixels with high-resolution critical item pixels where critical item pixels exist. A simple approach just replaces background pixels with high-resolution critical item pixels for the region. More complex approaches can soften the critical item window edges with edge blending techniques that interpolate between the critical item window and the background image. Alternately, the critical item identifier flag can be contained within each pixel in the critical item window that actually has a portion of the critical item visible. This flag can then determine whether to display the critical item or the background. This gives a pixel-sized cutout of the critical item rather than a larger region used in the other approaches.

This critical item system provides an approach that directs the majority of the computational resources directly at the potential items of interest rather than just in front of the aircraft or where the pilot's head happens to be pointing. The remainder of the scene is computed at a much lower level of resolution. The balance between the computation of critical items of interest and the background imagery is dynamically controlled to contain the total frame processing time within the capability of the rendering engines.

The benefit of this approach is that a much higher resolution can be achieved for portions of the output than would otherwise be affordable. In order to achieve a 3 times improvement using a conventional approach to improving resolution, a graphics system requires the computation of 9 times the number of pixels. With the critical item approach, the significant items or critical items can be computed at the higher resolution level and then inserted in a geometrically correct manner into a background scene of a much lower level of resolution.

As mentioned, a critical item can be any object identified in the database. In a flight simulator application, the critical items may be air targets, ground targets and waypoints. In addition to designating items of potential interest, the system can define the priority of those items. This priority determines how many of the critical items will be computed at the higher resolution. The goal of the real time load manager is to saturate the viewer with a large number of high-resolution objects elegantly embedded into the scene in such a manner as to convince the viewer that the entire scene has been computed and displayed at very high resolution. The benefit is that this visual solution works for an unlimited number of viewers. A head or eye-tracked area-of-interest system works only for a single observer. This invention works equally for all observers, even large audiences such as in a real-time digital theater or a planetarium application.

This approach can be used in visual applications where more performance in the area of resolution is desired and where a lower cost approach is needed. As pointed out above, this approach is not limited to just aircraft or military simulation. Any computational visual systems based on mathematical databases stand to benefit from this concept.

The critical item real time load management scheme can be tailored to any number of specific applications in such a way that the specific simulation requirements can be optimized. For example, if the primary simulation task is one of target recognition or object identification and the number of objects is known to be relatively small, the method can be optimized for maximum resolution. This is done by giving resolution top priority in the decision tree structure or by modification of the decision criteria. In addition, if the primary task is to find objects of interest from a large number of similar objects, the algorithm can be biased to display the maximum number of critical items at the expense of either the critical item window size or the resolution of each critical item.

If a system has a requirement for more critical items than is achievable with the existing allocation of critical item rendering engines, then the system can simply be configured with additional critical item rendering engines. If the ratio of critical item to background resolution is determined to be too large, then additional background rendering engines can be added to achieve the desired effect.

The flexibility of this critical item architecture is achieved via modularity of the hardware and software. The output of the critical item combiner is designed to be modular such that any number of displays and projectors can be addressed and any line and pixel count projection devices can be driven. This modularity allows the system to be configured to support a large array of conventional projection devices such as 1024×1280 pixel projectors or a small array of ultra high-resolution projectors with resolutions up to 4000 pixels by 8000 pixels.

Figure 3:
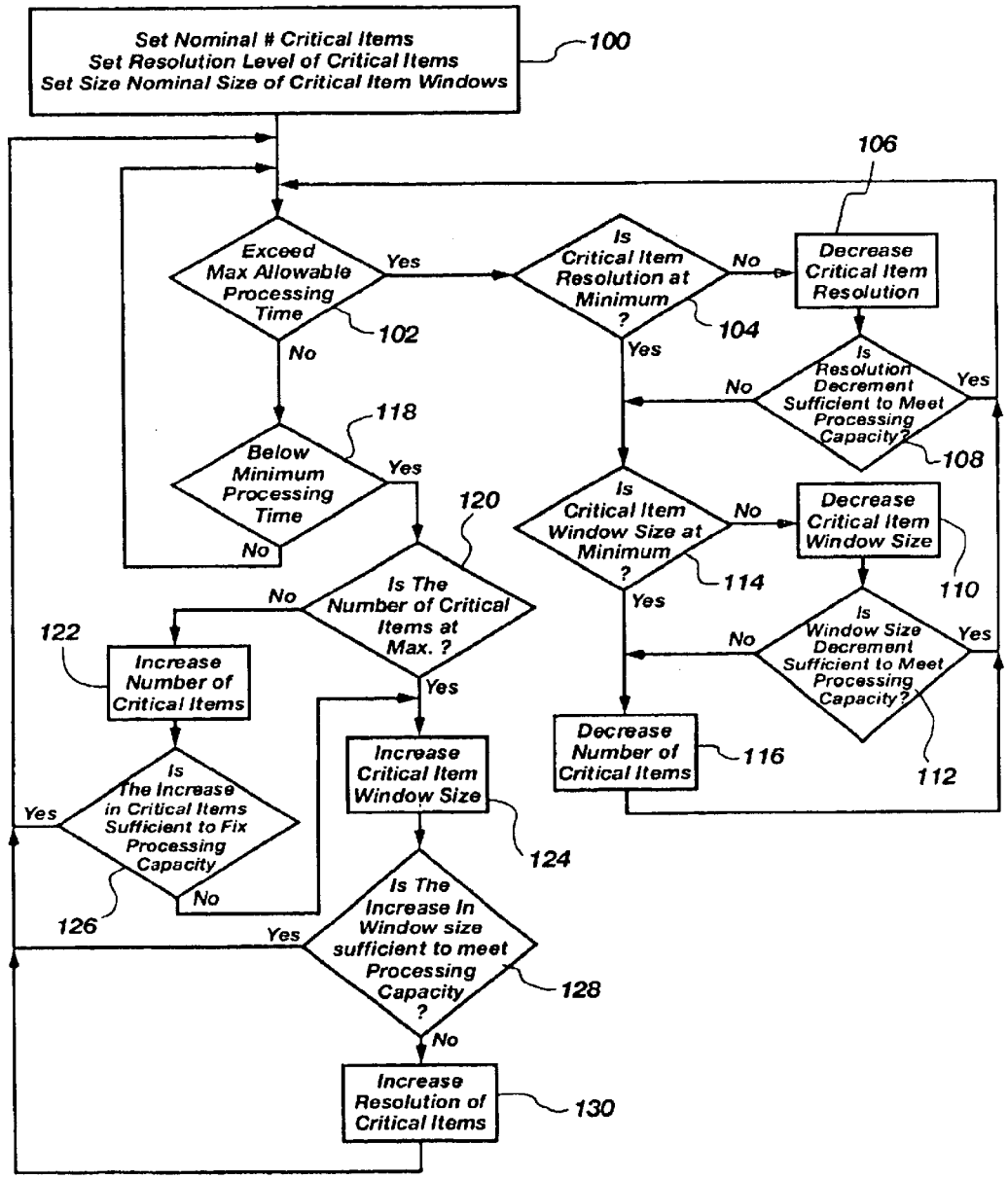
FIG. 3 is a flow chart of the steps that can take place in the present system to monitor and modify the critical item load.

FIG. 3 is a flow chart of an example critical item real time load management method. The initial step 100 is to set the nominal or pre-planned number of critical items that the system is expected to process based on the hardware available. In addition, the resolution level of the critical items and the critical item window sizes are set.

Once the processing begins, then the load manager checks to see if the critical item rendering engines are exceeding a maximum allowable time for processing a frame 102. If the maximum allowable time has been exceeded, then the system checks to see if the critical item resolution is at a minimum 104. If the critical item resolution is not at a minimum then the critical item resolution is decreased 106. Then the load manager checks to see if the decrease in resolution is sufficient to fall within the maximum allowable time for rendering 108. If the load is appropriate, the system continues and returns to decision point 102.

If the decrease in resolution is not enough, then the load manager checks to see if the critical item window size is at a minimum 114. If the critical item window size is not at a minimum then it is decreased 110 and the system checks to determine if the window size decrease is sufficient to fall within the maximum allowable processing time for rendering 112. If not, then the number of critical items being rendered is decreased 116.

Returning to the initial decision point 102, if the rendering is not exceeding the maximum allowable processing time, another check is performed. The system checks to see if the time for processing critical items is below a minimum processing time 118. If it is not, then the system proceeds with rendering. When the processing is below the minimum processing time, this means that the critical item rendering engines can process more polygons or objects.

Accordingly, the load manager checks to see if the number of critical items processed is at the maximum 120. If the maximum number of critical items has not been reached, then the number of critical items is increased 122. Moreover, if the increase in the number of critical items meets the minimum processing time 126, the system continues. Otherwise, when the maximum number of critical items is being rendered and there is available additional processing, the critical window size can be increased 124. After increasing the critical item window size, the load manager will check again to see if the increase in load meets the minimum processing time 128. If the minimum load processing time has not been reached, then the resolution of the critical items will be increased 130.

When the critical item technology is used in a specific application, a system design is preferably performed in advance to identify how much computational hardware will be used for the background imagery, and the critical item imagery. These parameters will be determined by the required display resolution and the available budget that can be applied to the required visual simulation.

One display output approach that can be used is to wait until all the critical items have been received in the high-resolution video memory before starting the read out to the displays and projectors. This approach introduces an entire frame of delay into the visual system. Applications such as flight simulator visual systems are very sensitive to transport delay. In order to avoid introducing this frame of delay into the visual pipeline, the system is preferably designed to order the critical item rendering based on a top to bottom ordering scheme. This allows the read out of the output memory before the memory input is completed, and eliminates the need for the very large memory required to store a complete frame of video. This will ensure that the total lag introduced in the critical item combiner is limited to a few milliseconds as opposed to a complete frame of delay.

Figure 4:
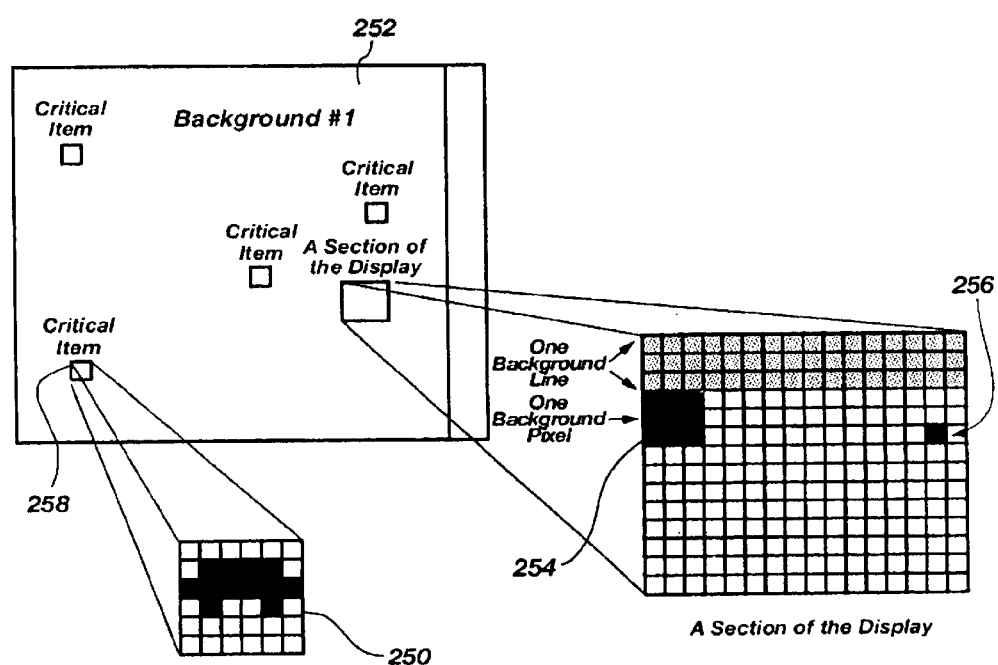
FIG. 4 illustrates critical items that are inset into an expanded lower resolution background.

FIG. 4 is a graphic representation of the insertion of critical item imagery into the interpolated, expanded background imagery. Both the critical items 250 and the background output video data 252 are combined at the native resolution of the display or projection device. In this example, the background video 254 has been computed at one-third the resolution of the critical items 256. The low-resolution background video is expanded by the critical item combiner to match the native resolution of the display device. The critical item video is inserted into the inflated background video at the address location 258 delivered along with the imagery. The result is a continuous image with the critical items having been rendered at three or more times the resolution of the background.

Figure 5:
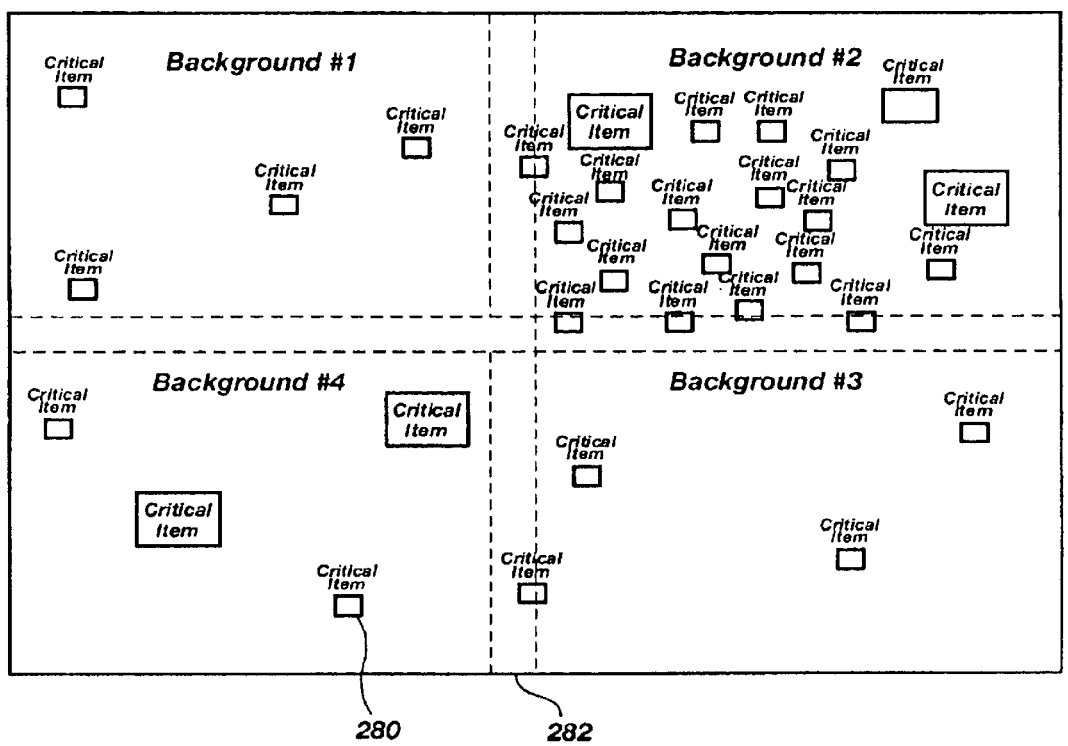
FIG. 5 illustrates a number of critical items that can be distributed between multiple display channels blended together to form an entire display.

FIG. 5 shows how the critical item data 280 is inserted into a multi-channel mosaic system and remains continuous across background display channel boundaries 282. The boundary between each display channel is blended to make the transition between channels more smooth. This invention provides extremely high detail imagery in areas of potential interest while conserving computational resources with less important objects. This approach has the ability to increase the effectiveness of the pixels computed by at least 3 fold and more often on the order of 10 fold or greater.

It should be noted that this approach does not become obsolete as graphics hardware power increases. This critical item system can be used to compute higher resolution output using less computational resources as compared to any other brute force approach.

It should also be noted that the embodiment depicted in FIG. 1 is for a global polygon data bus architecture. This present invention can also be applied to other architectures such a channelized architecture where polygons have been culled to a particular channel view-port definition.

Yet another advantage of this invention is that it is highly efficient and a cost effective visual system solution that can be implemented in hardware or software at a fraction of the cost of previous systems. The critical item rendering concept can also be extended to included other processing concepts beyond resolution (e.g., polygon density, advanced shading techniques, etc) which can enhance selected elements of the scene.

It is to be understood that the above-described arrangements are only illustrative of the application for the principles of the present invention. Numerous modifications and alternative arrangements can be devised without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment (s) of the invention, it will be apparent to those of ordinary skill in the art that numerous modifications can be made without departing from the principles and concepts of the invention as set forth in the claims.

What is claimed is:

1. A device for rendering computer graphic images, including a database and geometric processor to process a plurality of polygons, comprising:
    (a) a background rendering engine to render the polygons received from the geometric processor;
    (b) a critical item detector configured to identify polygons received from the geometric processor that have at least a portion of the polygon within a critical item region;
    (c) a critical item rendering engine to render polygons identified by the critical item detector, wherein the identified polygons are rendered at a higher resolution than the polygons rendered by the background rendering engine; and (d) a critical item load manager, coupled to the critical item rendering engine, to increase or decrease a critical item load being rendered by the critical item rendering engine and to match a deterministic processing time allowed.

2. A device as in claim 1, wherein the critical item load is increased or decreased by increasing or decreasing resolution of the critical items to conform to the deterministic processing time allowed for the critical rendering engine.

3. A device as in claim 1, wherein the critical item load is increased or decreased by increasing or decreasing critical item region sizes to conform to the deterministic processing time allowed for the critical rendering engine.

4. A device as in claim 1, wherein the critical item load is increased or decreased by increasing or decreasing the number of critical items rendered to conform to the deterministic processing time allowed in the critical rendering engine.

5. A device as in claim 1, further comprising a critical item combiner to combine polygons from the background rendering engine and the critical item rendering engine by using a critical item flag to identify and copy the pixels from the critical item rendering engine over the corresponding pixels rendered by the background rendering engine.

6. A device as in claim 5, further comprising a high-resolution display to receive and display a completed output from the critical item combiner.

7. A device as in claim 5, wherein the polygons with a critical item flag are rendered at low-resolution in the background rendering engine and at high-resolution in the critical item rendering engine and then the critical item combiner copies high-resolution polygons over corresponding low resolution polygons.

8. A device as in claim 5, wherein the polygons with a critical item flag are only rendered in the critical item rendering engine at high-resolution and then copied into the low-resolution background using the critical item combiner.

9. A device as in claim 1, wherein the critical item load manager further comprises a critical item rendering processor sensor to measure a length of time the critical item rendering engine takes to render a current list of polygons.

10. A device for rendering a high-resolution computer graphic image using polygons, comprising:
(a) a database having polygons which form an environment model, wherein every polygon in the environment model is able to be defined as a critical item;
(b) a critical item detector to detect critical item polygons associated with a critical item region to be rendered at a higher resolution;
(c) a rendering engine to render critical item polygons at a higher resolution than a rendered background; and
(d) a critical item combiner to expand the rendered background and inset higher resolution critical item polygons into the rendered background for simultaneous display.

11. A device as in claim 10, wherein the critical item combiner further comprises a background expander to expand a low-resolution background image into the high-resolution output format needed for display.

12. A device as in claim 11, wherein the critical item combiner further comprises an image blender configured to replace the expanded low-resolution background image with high-resolution critical item polygons where high-resolution critical item polygons have been rendered.

13. A device for rendering a high-resolution graphic image, comprising:
(a) a database of polygons where each polygon is enabled to be associated with a critical item flag and a critical item priority;
(b) a geometric processor to geometrically transform polygons from the database;
(c) a critical item detector configured to identify polygons received from the geometric processor, which are associated with a critical item region;
(d) a critical item rendering engine configured to receive polygons identified by the critical item detector using the critical item region, and to render the polygons in a higher resolution than background polygons; and
(e) a critical item load manager, coupled to the critical item rendering engine, to determine the number of critical items to be rendered for a frame based on a processing time available for rendering of critical items and the critical item priority of the polygons.

14. A device as in claim 13, wherein the polygons are arranged based on critical item priority and polygons with the highest critical item priority are rendered first based on the processing time available.

15. A method for rendering critical objects in a computer graphic image at a higher resolution than background objects in order to provide high-resolution output items for a viewer, comprising:
(a) associating a critical item flag with the critical objects stored in a database that models an environment;
(b) detecting critical objects based on a critical item region;
(c) rendering the detected critical objects at a higher resolution than background objects; and
(d) combining a lower resolution background with higher resolution critical objects.

16. A method as in claim 15, further comprising the step of expanding the lower resolution background to fill a display resolution.

17. A method as in claim 16, further comprising the step of insetting higher resolution critical objects into the lower resolution background to create a single frame.

18. A method as in claim 17, further comprising the step of allowing the high-resolution critical objects to be displayed together with the lower resolution background.

19. A method as in claim 15, further comprising the step of defining objects as at least one polygon.

20. A device for rendering computer graphic images, including a database of a plurality of polygons, comprising:
(a) a background rendering engine to render the polygons received from the database in lower resolution;
(b) a critical item detector configured to identify critical items received from database;
(c) a critical item rendering engine to render polygons identified by the critical item detector, wherein the identified polygons are rendered at a higher resolution than the polygons rendered by the background rendering engine; and
(d) a critical item combiner to expand the rendered background and copy higher resolution critical item polygons over corresponding background polygons in a
(e) display frame.

* * * * *